United States Patent [19]

Borrow et al.

[11] 3,761,512

[45] Sept. 25, 1973

[54] ANTI-VIRAL COMPOUNDS

[75] Inventors: Antony Borrow; Douglas Broadbent; Stephen Barnaby Carter; Gillian Margaret Evans; Harold George Hemming; Barrie Hesp; Carol Parton, all of Macclesfield, England

[73] Assignee: Imperial Chemical Industries Limited, London, England

[22] Filed: Feb. 28, 1972

[21] Appl. No.: 230,140

[52] U.S. Cl............ 260/485 G, 195/51, 260/488 B, 260/617 F, 424/311, 424/313, 424/343
[51] Int. Cl... C07c 35/44, C07c 69/20, C07c 69/40
[58] Field of Search.................... 260/488 B, 485 G, 260/617 F

[56] References Cited
OTHER PUBLICATIONS

Bull. Soc. Chim. (France) 1959, 1128.

*Primary Examiner*—Vivian Garner
*Attorney*—Cushman, Darby & Cushman

[57] ABSTRACT

Cyclohepta[a]naphthalene derivatives and processes for their preparation. Compounds are mitotic suppressants and active against DNA viruses, for example *Herpes simplex*.

2 Claims, No Drawings

ANTI-VIRAL COMPOUNDS

This invention relates to new compounds which are mitotic suppressants, that is, they inhibit mitosis, and which are active against DNA viruses, that is, viruses containing deoxyribonucleic acid, for example Herpes simplex and Vaccinia viruses.

According to the invention there are provided the compound which possesses the applicants' code number I.C.I. 69653, and the monoacetate thereof, and the hemisuccinate thereof and pharmaceutically-acceptable salts thereof.

I.C.I. 69653 has the structure (I) or its mirror image. The compound can be named systematically as $3\alpha,9\beta$-dihydroxy-$4\alpha,9\alpha$-bis(hydroxymethyl)-$4\beta,11b\beta$-dimethyl-2,3,4,4a$\alpha$,5,6,6a$\beta$,7,8,9,10,11,11a,11b-tetradecahydro-$8\beta,11a\beta$-methano-1H-cyclohepta[a]-naphthalene (or the mirror image in which $\alpha$ and $\beta$ are interchanged). The numbering system used is shown in the carbon skeleton (II). The compound has the molecular formula $C_{20}H_{34}O_4$.

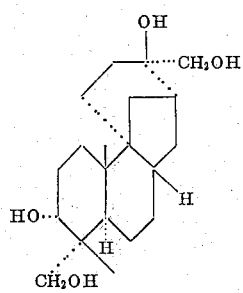

I

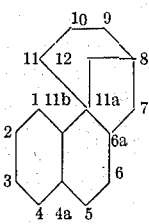

II

The monoacetate of I.C.I. 69653, hereinafter referred to by the code number I.C.I. 79743, has the molecular formula $C_{22}H_{36}O_5$. The hemisuccinate of I.C.I. 69653, hereinafter referred to by the code number I.C.I. 79744, has the molecular formula $C_{24}H_{38}O_7$. As suitable salts of I.C.I. 79744 there may be mentioned, for example, alkali metal salts, for example the sodium salt.

According to a further feature of the invention there is provided a process for the manufacture of I.C.I. 69653 which comprises cultivating an I.C.I. 69653-producing strain of Cephalosporium aphidicola in a suitable nutrient medium, whereafter the I.C.I. 69653 so produced is isolated from the culture medium.

The process may be carried out under surface culture or sumberged culture conditions. However, it is to be understood that some of the said strains of Cephalosporium aphidicola will only give I.C.I. 69653 on surface culture, whereas others will give the compound on submerged culture.

A strain which gives I.C.I. 69653 on surface culture is Cephalosporium aphidicola Petch I.M.I. 68689(ii), which has been deposited at, and is available to the public without any restrictions from, The commonwealth Mycological Institute, Ferry Lane, Kew, Surrey, England. A description of this strain is as follows:

COLONY APPEARANCE

When grown on agar media at room temperature (20°–22° C.), slow growing, not more than 2cm. in 5 days. White, floccose on all media tested, with thick, often crinkled, felt on Raper-steep and Isolation medium. Less vigorous growth on Potato/Dextrose, 2 percent Malt, Czapek-Dox or Raulin-Thom agar.

No pigment produced.

VEGETATIVE MYCELIUM

Septate, branching, hyaline.

SPORULATION

Conidiophores simple 20–40$\mu$m long, arising in whorls of two or three (occasionally more) from specialised prostrate conidiophore-bearing hyphae often exceeding 300$\mu$m in length. The conidiophores usually taper to a point from which phialospores arise in heads which can reach 20$\mu$m in diameter but which slime down on maturity.

Conidia are oblong-oval, cylindrical or, rarely, somewhat pyriform, always with obtuse ends 4–8 × 1.5–2.5 $\mu$m.

The media used are mostly those described in the literature, except that the isolation medium also used is as described in Journal of General Microbiology, (1953), 9, (2), 316, but with the Rose bengal omitted.

A strain of Cephalosporium aphidicola which gives I.CI. 69653 on submerged culture is Cephalosporium aphidicola Petch I.M.I. 68689(iii), which has likewise been deposited at, and is available to the public without any restrictions from, the said Commonwealth Mycological Institute. A description of this strain is as follows:

COLONY APPEARANCE

When grown on agar at room temperature (20°–22° C.), slow growing, not more than 2cm. in 5 days. White, floccose on all media tested with thick, somewhat crinkled, felt on Raper-steep and Isolation agar. Less vigorous growth on Potato/Dextrose, 2 percent Malt, Czapek-Dox and Raulin-Thom agar.

No pigment produced.

VEGETATIVE MYCELIUM

Septate, branching, hyaline.

SPORULATION

Conidiophores simple 20–40$\mu$m long, arising in whorls of two or three (occasionally more) from specialised, prostrate, conidiophore - bearing hyphae, often exceeding 300$\mu$m in length. The conidiophores taper to a point from which phialospores are budded to produce heads which can reach 20$\mu$m diameter, but which slime down on maturity.

Conidia are oblong-oval, cylindrical, rarely pyriform, 3–7 × 1–2.5 $\mu$m.

The surface or submerged cultivation process of the invention is carried out in conventional manner. The nutrient medium contains assimilable sources of carbon, nitrogen, phosphorus, magnesium, sulphur and potassium. Also, the nutrient medium preferably contains minute quantities of the so-called trace elements, i.e. iron, manganese, zinc, molybdenum and copper. The carbon source may be, for example, a sugar, for example glucose, and this source may be present in the medium in a concentration in the range 0.1–30 percent by weight, and preferably 5–15 percent by weight. The nitrogen source may be an inorganic source or an organic source, for example sodium nitrate, ammonium tartrate or corn steep liquor. The nitrogen source may be present in the medium in sufficient amount to provide 0.01 to 0.5 percent by weight of elementary nitrogen, and preferably 0.05 to 0.3 percent by weight of elementary nitrogen. The sources of phosphorus, magnesium, sulphur and postassium may be, for example, potassium dihydrogen phosphate, magnesium sulphate, a soluble sulphate such as magnesium sulphate, and potassium chloride, respectively. The process may be carried out at 18°–38° C., and preferably 20°–27° C.

At the completion of the cultivation process, the I.C.I. 69653 present in the culture medium may be isolated by filtration of the culture medium, adjustment of the culture filtrate to a pH of about 6.5, extraction of the culture filtrate with a suitable organic solvent, for example chloroform, drying of the organic solution, removal of the solvent by evaporation, and, if desired, crystallisation of the I.C.I. 69653 so obtained from a suitable solvent, for example ethyl acetate or 50 percent v/v aqueous acetic acid.

According to a further feature of the invention there is provided a process for the manufacture of I.C.I. 79743, which comprises mono-acetylating I.C.I. 69653.

As a suitable acetylating agent there may be mentioned, for example, acetic anhydride. The reaction may be carried out in a suitable organic solvent, for example dry pyridine.

According to a further feature of the invention there is provided a process for the manufacture of I.C.I. 79744 and pharmaceutically-acceptable salts thereof, which comprises reacting I.C.I. 69653 with an acylating agent derived from succinic acid, for example succinic anhydride.

The reaction may be carried out in a suitable organic solvent, for example dry pyridine.

The biological activities of the compounds of the invention have been demonstrated in standard biological test procedures. In particular, their mitotic suppressant activity has been demonstrated by exposing cultured mammalion cells (Earles L strain of mouse fibroblasts) to varying concentrations of the compound for 24 hours. The cells are subsequently fixed and stained, and are examined under the microscope to determine the effect of the compound on mitotic rate. The anti-(DNA) viral activity has been demonstrated *in vitro* and *in vivo* (in the rabbit eye).

When a compound of the invention is to be administered parenterally to a host, for example a human patient, in need of mitotic suppressant action or in need of action against a condition or disease caused, in part at least, by a DNA virus, the total daily dose may be 10–100mg./kg. of the compound. Alternatively, one of the said compounds, for example in a concentration of 1–10mg./ml., may be applied topically as necessary to the said host.

According to a further feature of the invention there are provided pharmaceutical compositions comprising I.C.I. 69653, I.C.I. 79743, or I.C.I. 79744 or a pharmaceutically-acceptable salt thereof, and an inert, non-toxic, pharmaceutically-acceptable diluent or carrier.

The pharmaceutical compositions of the invention may be in a form suitable for parenteral adminsitration, for example sterile injectable solutions or suspensions, or in a form suitable for administration as eye-drops, for example a ballmilled suspension in the presence of a dispersing agent, a suspension with 1% hydroxypropylmethylcellulose added, or a solution in dimethylsulphoxide. The pharmaceutical compositions of the invention are obtainable in a conventional manner using conventional diluents and carriers, and they may contain between 10 percent by weight and 80 percent by weight of the active ingredient. The pharmaceutical compositions of the invention may contain between 10mg. and 250mg. of the active ingredient. Suspensions and solutions may contain between 0.1mg. and 50mg. per ml. of the active ingredient.

The pharmaceutical compositions of the invention may contain, in addition to the abovementioned active ingredient, at least one agent which is known to be active against DNA viruses, for example idoxuridine (5-iodo-2'-deoxyuridine).

The invention is illustrated by the following Examples:

EXAMPLE 1

A nutrient medium was made up as follows:

| | |
|---|---|
| Sodium nitrate | 2.0g. |
| Potassium dihydrogen phosphate | 1.0g. |
| Magnesium sulphate heptahydrate | 0.5g. |
| Potassium chloride | 0.5g. |
| Ferrous sulphate heptahydrate | 0.01g. |
| Glucose ("Cerelose"; "Cerelose" is a registered trade mark) | 50.0g. |
| Yeast extract ("Oxoid" brand; "Oxoid" is a registered trade mark) | 1.0g. |
| Minor element concentrate (see below) | 1.0ml. |
| Distilled water to | 1 l. |

The minor element concentrate was made up as follows:

The compounds:

| | |
|---|---|
| Ferrous sulphate heptahydrate | 1.0g. |
| Copper sulphate pentahydrate | 0.15g. |
| Zinc sulphate | 1.0g. |
| Manganese sulphate tetrahydrate | 0.1g. |
| Potassium molybdate | 0.1g. | were dissolved in distilled water, sufficient concentrated hydrochloric acid was added to give a clear solution, and this was diluted to 1 l. with distilled water.

The nutrient medium was adjusted to pH 5.8 with 10N aqueous potassium hydroxide and then autoclaved at 15 p.s.i. for 25 minutes.

*Cephalosporium aphidicola* Petch I.M.I. 68689(ii) was grown at a temperature of 25° C. in surface culture in 200 bottles (capacity one-third pint, i.e., 190ml.) each containing 30ml. of the nutrient medium. The product was harvested after 31 days. The culture filtrate (2.73 l.) was acidified with aqueous 2N-hydrochloric acid to pH 6.5 and extracted four times with chloroform (560ml. each time). The combined chloroform extracts were dried with anhydrous sodium sulphate, and then evaporated to about 100ml. at 50° C./60mm. The concentrate was kept at 2° C. for 16 hours, and the colourless crystals which formed were collected by filtration. The solid residue was crystallised from 50 percent v/v aqueous acetic acid, and the resulting crystals dried at 40°C./2mm. Recrystallisation of these crystals from ethyl acetate gave I.C.I. 69653. The compound had the following characteristics:

a m.p. 227°–232° C.

b $[\alpha]_D^{27}$ + 11.84 (c, 1g./100ml. in methanol)

c molecular formula $C_{20}H_{34}O_4$ d Analysis: Found C, 70.6, H, 10.0, N, nil. Calc. for $C_{20}H_{34}O_4$, C, 70.97, H, 10.13, N, nil.

e Mass spectrum: Peak at m/e 307 ($C_{19}H_{31}O_3$) and m/e 320 ($C_{20}H_{32}O_3$). Corresponding to $C_{20}H_{34}O_4$ minus $-CH_2OH$ and $-H_2O$, respectively).

f Infra-red spectrum: max 3490, 3410, 3330, 1077, 1049, 1027 and 966cm$^{-1}$ (in Nujol)

g ULtra-violet spectrum: No absorption in the region 200–400nm (2.13mg. in 100ml. of methanol)

h Thin layer chromatography. $R_F$ 0.35 on silica gel GF (solvent system: 2 percent v/v glacial acetic acid, 3 percent v/v acetone, 5 percent v/v methanol, and 90 percent v/v ethyl acetate; indicator: chromic acid, followed by heat — the spot is first pink and becomes black).

i Upon treatment with acetic anhydride in pyridine at 22° C. for 50 minutes, I.C.I. 69653 forms a diacetate of m.p.163.5°–165.5° C. Calc. for $C_{24}H_{38}O_6$, C, 68.2, H, 9.1. Found C, 67.9, H, 8.9.

j Upon treatment with acetic anhydride in pyridine for 16 hours at 22° C., I.C.I. 69653 forms a triacetate of m.p.145°–147° C. Calc. for $C_{26}H_{40}O_7$, C, 67.2, H, 8.7. Found C, 67.2, H, 8.8.

k Upon treatment with periodic acid in aqueous acetic acid as described below, I.C.I. 69653 gave a compound of m.p.152°–156° C.

To a stirred mixture of I.C.I. 69653 (200mg.) in glacial acetic acid (12.4ml.) and water (6.2ml.), maintained at 22° C., there was added 0.87ml. of a 50 percent w/w solution of periodic acid ($H_5IO_6.H_2O$) in water. After 10 minutes the mixture was diluted with water (120ml.) and extracted with chloroform (4 × 120ml.). The extracts were dried over anhydrous sodium sulphate, and then concentrated under reduced pressure to an oil which was separated by chromatography on silica gel (25g.) 9:1 Chloroform-petroleum ether (b.p.60°–80° C.) eluted a solid which after three crystallisations from a mixture of petroleum ether (b.p.60°–80° C.) and ethyl acetate had m.p.152°–156° C.

l Upon treatment with chromium trioxide in acetic acid as described below, I.C.I. 69653 gave a compound of m.p.172°–175° C.

To a stirred solution of I.C.I. 69653 (500mg.) in glacial acetic acid (20ml.) at 22°C. were added dropwise, over a period of 40 minutes, 15ml. of a solution containing chromium trioxide (2g.) and concentrated sulphuric acid (3.02g.) in water (20ml.). After the reaction mixture had been stirred for a further hour at 22° C., ethanol (10ml.) was added and the mixture was extracted with ether (4 × 100ml.). The ethereal extracts were dried over anhydrous sodium sulphate, and then concentrated to give an oil which solidified. Two crystallisations of the solid from a mixture of ethyl acetate and petroleum ether (b.p.60°–80° C.) gave colourless needles of m.p.172°–175° C.

Example 2

Cephalosporium aphidicola Petch I.M.I. 68689(iii) was used to inoculate agar slants containing the following medium:

| | |
|---|---|
| Sucrose | 3g./l. |
| Dextrin | 15g./l. |
| Urea | 0.1g./l. |
| Sodium chloride | 0.5g./l. |
| Postassium dihydrogen phosphate | 0.5g./l. |
| Yeast extract | 1.0g./l. |
| Peptone | 5.0g./l. |
| Ferrous sulphate heptahydrate | 0.01g./l. |
| Agar | 20.0g./l. |

The medium was sterilised by autoclaving at 15 p.s.i. for 20 minutes without adjustment of pH. The final pH was 6.5–6.6. The slants were incubated at 25° C. for 4–7 days.

Aliquots of the organism from the agar slants were used to inoculate 100ml. of nutrient medium in 500ml. conical flasks. The medium in the flasks had the same composition as that described in Example 1. The flasks were sterilised by autoclaving at 15 p.s.i. for 20 minutes. The flasks were incubated at 25° C. for 3 days on a rotary shaker with 2 inches throw, running at 240 r.p.m.

The contents of one flask were used to inoculate a stirred fermenter containing 30 l. of the following medium:

| | |
|---|---|
| Sucrose | 40g./l. |
| Sodium nitreate | 2.2g./l. |
| Potassium dihydrogen phosphate | 5 g./l. |
| Magnesium sulphate heptahydrate | 1g./l. |
| Potassium chloride | 0.5g./l. |
| Minor element concentrate | 0.2% (v/v) |

The medium was sterilised at 15 p.s.i. for 30 minutes. The fermenter was a fully baffled tank, the agitator running at 320 r.p.m., with sterile air supplied at 15 l./min. The culture was incubated at 25° C. for 17 days.

The mycelium was removed by filtration, yielding 22 l. of filtrate at pH 4.1. The pH was adjusted to pH 6.5 with 5N-sodium hydroxide, and extracted twice with 5.5 l. of chloroform. The chloroform extract was dried over sodium sulphate. The filtrate was concentrated at approximately 45° C. in vacuo to approximately 100ml., and left overnight at room temperature. The resulting mixture was filtered, and there was thus obtained I.C.I. 69653.

EXAMPLE 3

To a stirred solution of I.C.I. 69653 (2g.) in dry pyridine (25ml.) was added acetic anhydride (0.302g.) in dry pyridine (5ml.). The mixture was stirred at room temperature for 17 hours before addition of a further portion of acetic anhydride (0.302g.) in dry pyridine (5ml.). The mixture was stood at room temperature for 3 hours. Water (10ml.) was then added, and the mixture was stirred for a further 3 hours. At the end of this period water (5ml.) and a solution of 50 percent w/w aqueous periodic acid (17.3ml.) were added. The mixture was stirred for 15 minutes, acidified to pH 2 with 30 percent sulphuric acid and extracted with ethyl acetate (5 × 20ml.). The organic extracts were combined, washed successively with 3N sodium hydroxide (4 × 15ml.) and water (2 × 25ml.). and then dried over sodium sulphate. Evaporation of the ethyl acetate yielded a solid which, after two recrystallisations from ethyl acetate, gave 9α-acetoxymethyl-3α,9β-dihydroxy-4α- hydroxymethyl-4β,11bβ-dimethyl-2,3,4,4aα,5,6,6aβ,7,8,9,10,11,11a,11b-tetradecahydro-8β,11aβ-methano-1H-cyclohepta[a]-naphthalene (or the mirror image in which α and β are interchanged), code number I.C.I. 79743, as colourless needles of m.p.193.5°–196° C. (Found: C, 69.3, H, 9.3 percent, $C_{22}H_{36}O_5$ requires C, 69.4, H, 9.5 percent).

EXAMPLE 4

Succinic anhydride (1.48g.) was added portionwise over a period of 24 hours to a stirred solution of I.C.I. 69653 (5g.) in dry pyridine (75ml.) at room temperature. After the mixture had been stirred for an additional 22 hours, water (50ml.) and 50 percent w/w aqueous periodic acid (42.5ml.) were added. The solution was stirred for 20 minutes, acidified to pH 2 with 30 percent sulphuric acid, and extracted with ethyl acetate (1 × 200 and 2 × 150ml.) The combined extracts were washed with water (100ml.) and then extracted with saturated sodium carbonate solution (2 × 100ml.). The combined alkaline extracts were washed with ethyl acetate (100ml.), and the organic washing was discarded. The alkaline layer was acidified to pH 2 with 30 percent sulphuric acid and then extracted with ethyl acetate (1 × 200, 2 × 150ml.). The combined organic extracts were washed with water (2 × 200ml.), dried over sodium suphate, then concentrated at 50° C. *in vacuo* to a pale yellow oil (4.6g.) which was redissolved in a small volume of ethyl acetate and set aside to crystallise. There was obtained in this way 9α-(3-carboxypropionyloxymethyl)-3α,9β-dihydroxy-4α-hydroxymethyl-4β,11bβ-dimethyl-2,3,4,4aα,5,6,6aβ,7,8,9,10,11,11a,11b-tetradecahydro-8β,11aβ-methano-1H-cyclohepta[a]-naphthalene (or the mirror image in which α and β are interchanged), code number I.C.I. 79744, as colourless crystals of m.p.142°–146° C.

A stirred solution of I.C.I. 79744 (0.2g.) in 50 percent aqueous methanol (50ml.) was titrated with 0.1 N sodium hydroxide (4.55ml.) until the pH of the solution was 8.0. Most of the methanol was removed *in vacuo* at 30° C. and the resulting solution was filtered and then freeze-dried. There was obtained in this way the sodium salt of I.C.I. 79744 as a colourless solid.

EXAMPLE 5

A dispersing agent of the following composition was prepared:

| | |
|---|---|
| Nonylphenol ethylene oxide condensate ('Lissapol' NX: 'Lissapol' is a trade mark) | 1ml. |
| Sodium salt of sulphated cetyl/oleyl alcohol mixture ('Lissapol' C) | 1g. |
| Polyglyceryl ricinoleate, 30percent w/v in water ('Dispersol' O.G.; 'Dispersol' is a trade mark) | 3.3ml. |
| Water to | 1 litre |

I.C.I. 69653 (0.1g.) was suspended in the said dispersing agent (10ml.), and the suspension was ball-milled for 18 hours at 4° C. The suspension was then diluted to 1 to 10 in a 1 percent w/v aqueous solution of hydroxypropylmethylcellulose, such that the final suspension contained 1mg./ml. of I.C.I. 69653 and 0.1 percent w/v of hydroxypropylmethylcellulose.

What we claim is:

1. A compound selected from the group consisting of a compound of the formula:

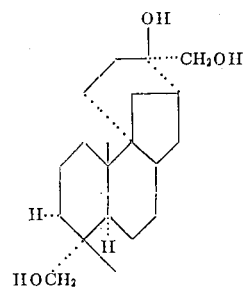

I the 9α-monacetate thereof, the 9α-hemisuccinate thereof and pharmaceutically acceptable salts of said hemisuccinate.

2. A hemisuccinate salt as claimed in claim 1 which is an alkali metal salt.

* * * * *